US007312918B2

(12) United States Patent
Ishikawa et al.

(10) Patent No.: US 7,312,918 B2
(45) Date of Patent: Dec. 25, 2007

(54) OPTICAL TRANSMISSION SYSTEM HAVING FUNCTION OF CORRECTING NOISE LIGHT DUE TO RAMAN AMPLIFICATION

(75) Inventors: Eiji Ishikawa, Kawasaki (JP);
Toshihiro Otani, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 11/138,492

(22) Filed: May 27, 2005

(65) Prior Publication Data
US 2005/0213196 A1 Sep. 29, 2005

Related U.S. Application Data

(63) Continuation of application No. PCT/JP03/06479, filed on May 23, 2003.

(51) Int. Cl.
*H01S 4/00* (2006.01)
*H04B 10/12* (2006.01)
(52) U.S. Cl. ............... 359/334; 398/12; 398/26
(58) Field of Classification Search ........... 359/334; 398/12, 26
See application file for complete search history.

(56) References Cited
U.S. PATENT DOCUMENTS

| | | | | |
|---|---|---|---|---|
| 5,282,074 A | * | 1/1994 | Miyazaki et al. ............ | 398/26 |
| 5,355,250 A | * | 10/1994 | Grasso et al. ............ | 359/341.44 |
| 5,701,195 A | | 12/1997 | Chikama | |
| 6,219,177 B1 | * | 4/2001 | Tamura .................. | 359/341.1 |
| 6,373,621 B1 | * | 4/2002 | Large et al. ............. | 359/334 |
| 6,621,621 B1 | * | 9/2003 | Jones et al. ............. | 359/337.11 |
| 6,639,716 B1 | * | 10/2003 | Tomofuji ............... | 359/337.12 |

FOREIGN PATENT DOCUMENTS

| | | |
|---|---|---|
| JP | 5-257177 | 10/1993 |
| JP | 8-331048 | 12/1996 |
| JP | 11-275025 | 10/1999 |
| JP | 2000-232433 | 8/2000 |
| JP | 2000-349718 | 12/2000 |
| JP | 2003-101480 | 4/2003 |
| JP | 2003-114453 | 4/2003 |

* cited by examiner

*Primary Examiner*—Jack Keith
*Assistant Examiner*—Eric Bolda
(74) *Attorney, Agent, or Firm*—Staas & Halsey LLP

(57) ABSTRACT

An optical transmission system wherein a main signal light is amplified by Raman amplification, and noise light (ASS light) produced by the Raman amplification can be corrected with a simple configuration and with high accuracy. The optical transmission system includes, in each transmission section: a cutoff section for transmitting/cutting off a main signal light outputted from the optical transmitter on the preceding stage and inputted into the Raman amplification medium on an optical transmission line; a control section for varying the power of the pumping light supplied to the Raman amplification medium and changing the state of the cutoff section depending on the variation of the pumping light power; a monitor section for measuring the power of the pumping light supplied to the Raman amplification medium and the power of the light propagated through the optical transmission line and inputted into an optical transmitter on the succeeding stage; and a processing section for separately detecting the power of the main signal light and the power of the ASS light on the basis of the results of the measurement by the monitor section, and correcting the ASS light.

16 Claims, 6 Drawing Sheets

OPTICAL TRANSMISSION SYSTEM HAVING FUNCTION OF CORRECTING NOISE LIGHT DUE TO RAMAN AMPLIFICATION This application is a continuation of PCT/JP03/06479, filed on May 23, 2003.

BACKGROUND OF THE INVENTION

1. Field of the Invention

The present invention relates to an optical transmission system which amplifies a main signal light using Raman amplification, and in particular an optical transmission system comprising a function for measuring the power of noise light generated by Raman amplification and making corrections.

2. Description of the Related Art

As a conventional optical transmission system, for example, there is known a system where wavelength division multiplexed (WDM) signal light which is made by multiplexing a plurality of beams of signal light with different wavelengths, is sent from a sending terminal station to an optical transmission line. Then the WDM signal light is repeatedly transmitted to a receiving terminal station while being amplified by a plurality of repeater stations (optical amplifiers) arranged on the optical transmission line. Regarding such a system, for example there is proposed a technique which measures the input light power to the optical amplifiers, calculates the power of noise light generated in the local station on the basis of the results of the measurement, and then corrects with respect to an output setting level of an automatic level control (ALC), to keep the signal light power per wavelength included in the output light of the optical amplifiers at a constant regardless of the number of wavelengths. This is done to improve the transmission characteristic (for example, refer to Japanese Unexamined Patent Publication No. 2000-232433).

However, the abovementioned conventional technique has the following problems. That is, in the conventional technique, when correcting with respect to the output setting level, the noise light power generated in the local station is obtained by calculation based on: a measured value by a moniter provided in an input section of the optical amplifier, specifically a measured value of the input light power corresponding to the sum of the WDM signal light power which is inputted into the optical amplifier, and the noise light power generated in the repeater station of the preceding stage; various characteristics of the optical amplifier corresponding thereto; and the number of wavelengths of the WDM signal light. Since as mentioned above, the measured value of the noise light power is the sum of the signal light power and the noise light power, the calculated value of this noise light power can only be obtained by estimation taking into account the corrected value of the output setting level in the repeater station of the preceding stage. Accordingly, there is a problem in that the corrected value of the output setting level of the local station obtained by using the calculated value of the noise light power as mentioned above, includes an error, and the error is accumulated as the number of the repeater stations is increased.

Moreover, if the abovementioned conventional technique is applied to a system which has been drawing attention recently, which jointly uses Raman amplifiers to repeatedly transmit the WDM signal light, it is necessary to correct the noise light due to the stimulated Raman scattering which is caused by the pumping light supplied to the Raman amplification medium arranged between the repeater station of the preceding stage and the local station. In the following description, the noise light due to the stimulated Raman scattering is called ASS (Amplified Stimulated Raman Scattering) light. Regarding the correction of such ASS light as well as the case of correction of the noise light generated in the repeater station of the preceding stage mentioned above, it is difficult to measure the generation state separately from the WDM signal light. Therefore, the power of the ASS light is estimated by calculation using predetermined coefficients and the like. Accordingly, there is a problem in that arithmetic processing is complicated and becomes an error factor at the same time.

Incidentally, as a well-known technique for measuring the noise characteristics of an optical amplifier, there is proposed a technique for example, where the signal light inputted into the optical amplifier is given a required pulse modulation. A light cutoff device is provided on the output side of the optical amplifier, so that the output light is received while operating the light cutoff device in synchronism with the input light level so as to measure the noise characteristics. Where an optical coupler is provided on the output side of the optical amplifier to branch the output light into two, then one part of the output light is delayed until they do not correlate with each other to make it a local oscillating light from the station, and heterodyne detection is performed using a dual balance type optical receiver, so as to measure the noise characteristics (for example, refer to Japanese Unexamined Patent Publication No. 5-257177).

If the noise light is corrected as mentioned above by applying this well-known technique, it becomes possible to actually measure the power of the noise light locally generated in the local station by arranging the light cutoff device and the like on the output side of the optical amplifier. However, it is not possible to measure the power of the noise light generated on the upstream side from the local station, specifically the ASS light which is generated in a distributed manner on the optical transmission line between the repeater station of the preceding stage and the local station. Therefore, it is difficult to realize correction of the noise light with high accuracy. Moreover, since the noise light is measured by giving the input light to the optical amplifier a required pulse modulation to synchronize it with the light cutoff device, or by using the dual balance type optical receiver, there is also a disadvantage in that a complicated configuration and complicated processing are required.

SUMMARY OF THE INVENTION

The present invention addresses the above points with an object of enabling, in an optical transmission system wherein a main signal light is amplified by Raman amplification, noise light produced by the Raman amplification to be corrected with a simple configuration and with high accuracy.

In order to achieve the above object, an optical transmission system of the present invention having a function of correcting noise light due to Raman amplification is constructed such that in an optical transmission system comprising: an optical transmission line through which a signal light is propagated, a plurality of optical transmitters arranged on the optical transmission line, and a plurality of Raman pumping light supply sections which supply pumping light to Raman amplification medium on optical transmission line connected to the input sides of the plurality of optical transmitters, there is provided in each transmission section corresponding to the respective optical transmitters, a cutoff section, a control section, a monitor section, and a processing section. The cutoff section can cutoff a main signal light outputted from an optical transmitter on a preceding stage and inputted into the Raman amplification medium. The control section controls the Raman pumping light supply section at the time of starting up the system, to vary the power of the pumping light supplied to the Raman amplification medium, and controls the cutoff section depending on the variation of the pumping light power, and switches between a connection state where the main signal light is propagated through the Raman amplification medium, and a disconnection state where the main signal light is not propagated through the Raman amplification medium. The monitor section respectively measures the power of the pumping light supplied from the Raman pumping light supply section to the Raman amplification medium, and the power of the light propagated through the optical transmission line and sent to an optical transmitter on a succeeding stage. The processing section separately detects the power of the noise light generated due to the Raman pumping light, and the power of the main signal light inputted into the optical transmitter on the succeeding stage, on the basis of a control state of the cutoff section due to the control section, and the results of the measurement by the monitor section, and corrects the noise light.

In the optical transmission system of such a configuration, by controlling the state of the cutoff section depending on the variation of the power of the pumping light supplied to the Raman amplification medium on the optical transmission line, the total power of the main signal light and the ASS light is measured in a connection state where the main signal light is propagated through the Raman amplification medium. The power of the sole ASS light is measured in a disconnection state where the main signal light is not propagated through the Raman amplification medium, so that the power of the main signal light inputted into the optical transmitter on the succeeding stage, and the power of the ASS light can be separately detected by using these measurement results. Accordingly, the ASS light can be corrected with high accuracy with a simple configuration compared to the conventional system.

Other objects, features and advantages of the present invention will become apparent from the following description of embodiments, in conjunction with the appended drawings.

DESCRIPTION OF THE PREFERRED EMBODIMENTS

Hereunder is a description of embodiments related to an optical transmission system of the present invention having a function of correcting noise light due to Raman amplification, with reference to the appended drawings. Throughout all of the drawings, the same reference symbols refer to the same or corresponding parts.

Figure 1:
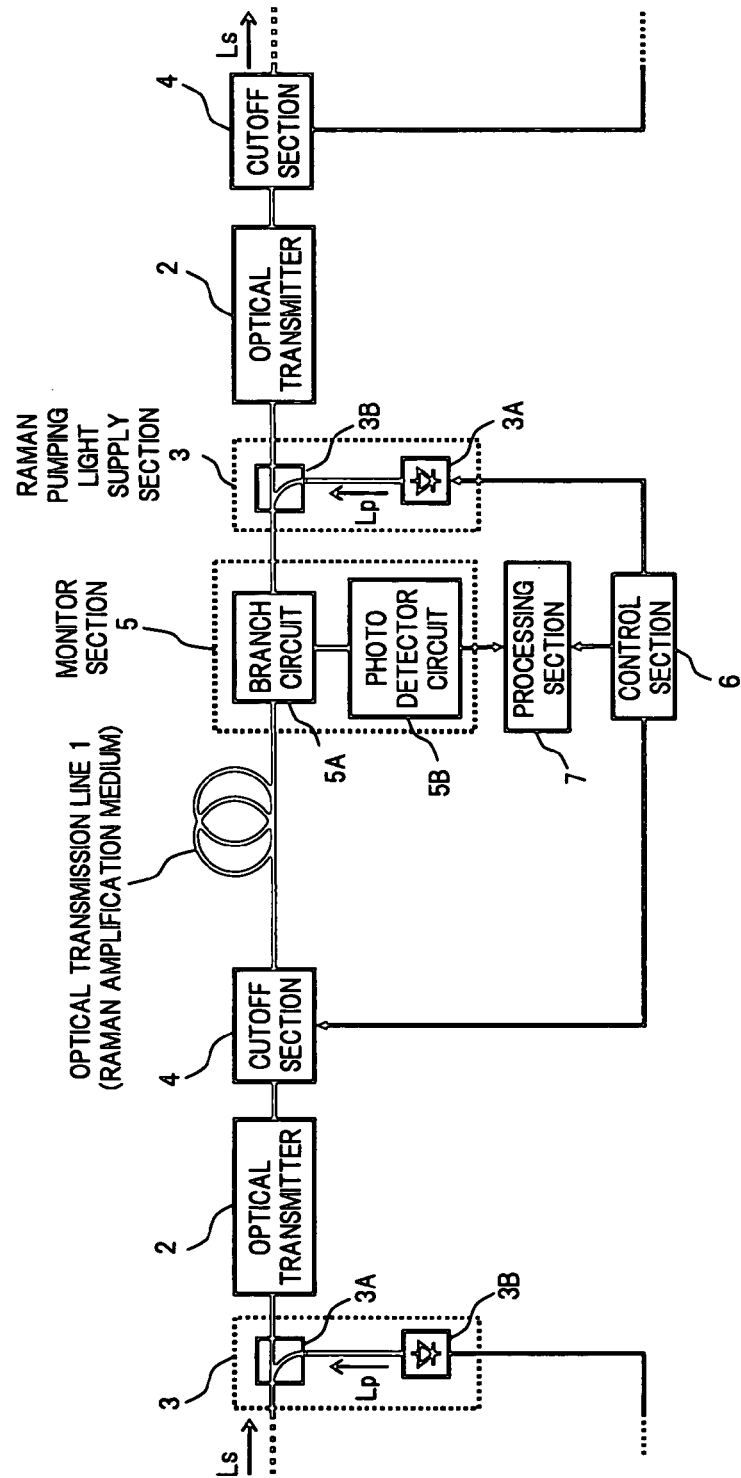
FIG. 1 is a block diagram showing the basic configuration of an optical transmission system according to the present invention.

FIG. 1 is a block diagram showing the basic configuration of the optical transmission system according to the present invention.

In FIG. 1, a plurality of optical transmitters 2 are arranged on an optical transmission line 1 through which a main signal light Ls is propagated, and a pumping light Lp is supplied from a Raman pumping light supply section 3 on the optical transmission line 1 which is respectively connected to the input side of respective optical transmitters 2. A main signal light Ls is transmitted while being Raman amplified. There is respectively provided for each transmission section corresponding to the optical transmitters 2; a cutoff section 4, a monitor section 5, a control section 6, and a processing section 7. Hereunder is a detailed description of the respective configurations mentioned above.

The optical transmission line 1 is for mutually connecting between a sending terminal station and a receiving terminal station (not shown) using a general optical transmission medium such as an optical fiber or the like. On this optical transmission line 1, a plurality of repeater stations are arranged at required intervals, so that the main signal light Ls sent from the sending terminal station to the optical transmission line 1 is repeatedly transmitted to the receiving terminal station via the respective repeater stations. The main signal light Ls may be either a beam of signal light with a single-wavelength, or WDM signal light which is made by multiplexing a plurality of beams of signal light with different wavelengths.

The optical transmitters 2 are general optical transmitters which are used for the abovementioned sending terminal station, receiving terminal station, or repeater stations. The optical transmitter 2 may have a function for locally amplifying the main signal light Ls being input, using a well-known optical amplifier such as a rare earth doped fiber amplifier or a semiconductor optical amplifier. However, the present invention is effective even if the optical transmitter 2 does not have an amplification function for the main signal light Ls.

The Raman pumping light supply section 3 has for example, a Raman pumping light source 3A and a WDM coupler 3B. The Raman pumping light source 3A generates the pumping light Lp having the wavelength set according to the wavelength band of the main signal light Ls. The power of this pumping light Lp outputted from the Raman pumping light source 3A is controlled in accordance with a control signal from the control section 6. The WDM coupler 3B is provided for example, in the vicinity of the signal light output terminal of the optical transmission line 1 connected to an input port of the optical transmitter 2, so that it supplies the pumping light Lp outputted from the Raman pumping light source 3A, in the opposite direction to the direction of propagation of the main signal light Ls on the optical transmission line 1, and transmits the main signal light Ls propagated through the optical transmission line 1, to the optical transmitter 2 on the succeeding stage. Here, the optical transmission line 1 connecting between the optical transmitters 2 becomes the Raman amplification medium, so that the main signal light Ls propagated through the optical transmission line 1 is Raman amplified in a distributed manner.

Here the description is for a system applied with the Raman amplification of a distribution type. However, the present invention is not limited to this and may be a system applied with concentrated Raman amplification, that is a system where a Raman amplification medium which readily generates a nonlinear effect compared to a general optical transmission medium, is arranged separately on the optical transmission line 1, so that the main signal light Ls is Raman amplified in a concentrated manner within the Raman amplification medium. Moreover, here the description is for a configuration where the pumping light Lp outputted from the one Raman pumping light source 3A is supplied to the optical transmission line 1 via the WDM coupler 3B. However the configuration may be such that for example, a plurality of Raman pumping light sources are used, and the respective pumping lights outputted therefrom are multiplexed into one and then supplied to the optical transmission line 1 via the WDM coupler 3B. In this case, the power of the light outputted from the Raman pumping light sources is controlled in accordance with control signals from the control section 6 while keeping a preset distribution ratio.

The cutoff section 4 is arranged between an output port of the optical transmitter 2 on the preceding stage, and a signal light input terminal of the Raman amplification medium (here, the overall optical transmission line 1) which receives the supply of the pumping light Lp from the Raman pumping light supply section 3 provided on the input side of the optical transmitter 2 on the succeeding stage, and cuts off the main signal light Ls outputted from the optical transmitter 2 on the preceding stage and inputted into the Raman amplification medium, in accordance with a control signal from the control section 6. Specifically, an optical switch having one input and two outputs, or an optical shutter or the like may be used for the cutoff section 4.

The monitor section 5 has for example, a branch circuit 5A and a photodetector circuit 5B. The branch circuit 5A has a function of branching a part of the pumping light Lp supplied from the Raman pumping light supply section 3 to the optical transmission line 1 and transmitting it to the photodetector circuit 5B, and branching a part of the light propagated through the optical transmission line 1 in the same direction to that of the main signal light Ls and transmitting it to the photodetector circuit 5B. The photodetector circuit 5B receives the light branched by the branch circuit 5A and measures its power, then respectively detects the power of the Raman pumping light Lp supplied to the optical transmission line 1, and the power of the light propagated through the optical transmission line 1, and outputs a signal showing the result to the processing section 7.

The control section 6 controls the operation of the Raman pumping light source 3A in accordance with a required control sequence as described later so as to vary the power of the pumping light Lp supplied to the optical transmission line 1, and controls the state of the cutoff section 4 in accordance with the control sequence so as to switch the transmission/cutoff of the main signal light Ls from the optical transmitter 2 on the preceding stage to the optical transmission line 1.

The processing section 7 separately detects the power of ASS light and the power of the main signal light Ls inputted to the optical transmitter 2 on the succeeding stage, on the basis of the outputted signal from the monitor section 5 and the signal showing the control state of the cutoff section 4 due to the control section 6, and corrects the ASS light according to the detection result, and obtains a relationship of the power of the main signal light with respect to the pumping light power.

Next is a description of the operation of the optical transmission system having the abovementioned basic configuration.

In the above optical transmission system, at the time of starting up, in order to acquire the required data concerning the transmission characteristic of the main signal light Ls, the power of the light propagated through the optical transmission line 1 is measured while varying the power of the pumping light Lp supplied on the optical transmission line 1 within a preset range, in each transmission section corresponding to the respective optical transmitter 2, and switching the transmission/cutoff state of the main signal light Ls from the optical transmitter 2 on the preceding stage to the optical transmission line 1. By this measurement, as described in detail later, the relationship of the power of the main signal light including the ASS light with respect to the Raman pumping light power, and the relationship of the sole power of the ASS light with respect to the Raman pumping light power are respectively acquired. Therefore, by correcting the ASS light using these relationships, the relationship of the power of the main signal light with respect to the Raman pumping light power can be obtained.

As one specific procedure of the processing executed in the respective transmission sections at the time of starting up the system, firstly the state of the cutoff section 4 is controlled so that the main signal light Ls outputted from the optical transmitter 2 on the preceding stage is transmitted to the optical transmission line 1 (hereunder, this state is called "transmission path connection state"). Then the drive state of the Raman pumping light source 3A is controlled to successively vary the power of the pumping light Lp from a minimum value to a maximum value within a required range, and the power of the pumping light Lp actually supplied to the optical transmission line 1, and the power of the light propagated through the optical transmission line 1 at the time of supplying the pumping light, are sequentially measured by the monitor section 5. Accordingly, for example as shown in FIG. 2(A), a relationship (i) is acquired showing how the total power of the light obtained by adding the ASS light generated by the pumping light Lp to the main signal light Ls which is outputted from the optical transmitter 2 on the preceding stage and Raman amplified while being propagated through the optical transmission line 1, changes with respect to the variation in the power of the pumping light Lp ranging from the minimum value to the maximum value.

Next, the state of the cutoff section 4 is switched so as to cutoff the transmission of the main signal light Ls from the optical transmitter 2 on the preceding stage to the optical transmission line 1 (hereunder, this state is called "transmission path disconnection state"), and similar measurements to the abovementioned case are repeated. In this transmission path disconnection state, although there is no input of the main signal light Ls to the optical transmission line 1, the ASS light generated in the middle of the optical transmission line 1 by the pumping light Lp supplied from the Raman pumping light supply section 3 is inputted to the monitor section 5 for the same amount regardless of the presence/absence of the main signal light Ls. Accordingly, as shown in FIG. 2(B), a relationship (ii) is acquired showing how the power of the sole ASS light generated by the pumping light Lp changes with respect to the variation in the power of the pumping light Lp ranging from the minimum value to the maximum value.

Figure 2:
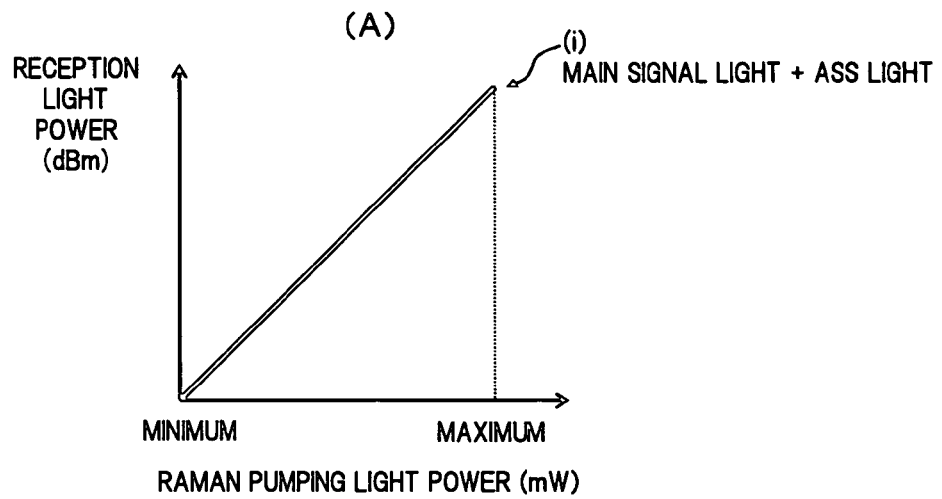
FIG. 2 shows an example of data acquired at the time of starting up the optical transmission system of the present invention.
Figure 2:
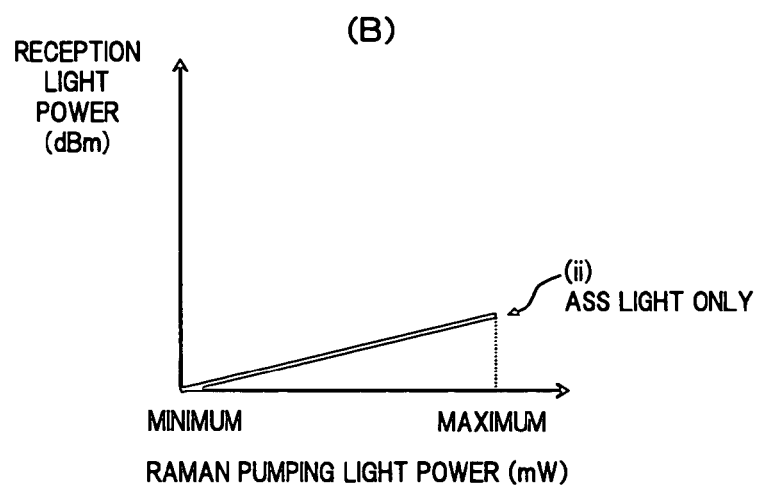
Figure 2:
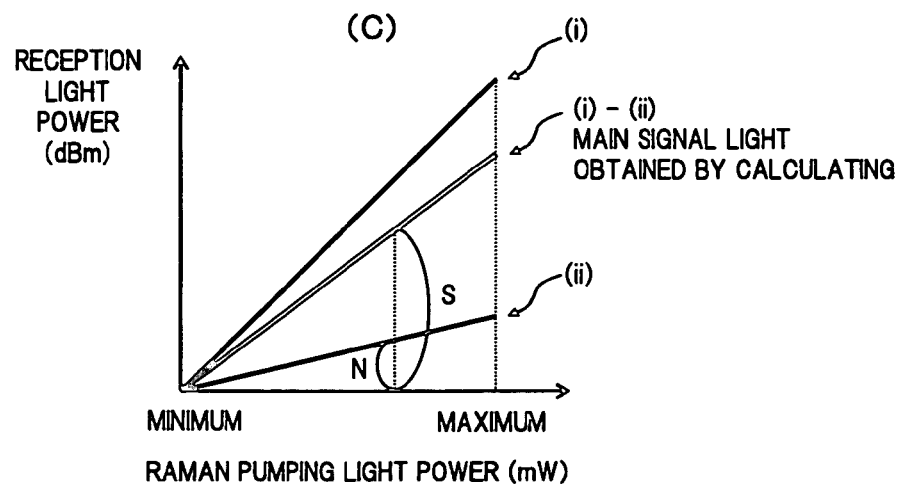

After the relationships (i) and (ii) are acquired, then regarding data corresponding to the power of the mutually equal pumping lights Lp, processing for subtracting the light power acquired in the transmission path disconnection state from the light power acquired in the transmission path connection state, namely as shown in FIG. 2C, arithmetic processing for obtaining the relationship of (i)-(ii) is executed in the processing section 7. Accordingly, the ASS light is corrected and the relationship of the power of the sole main signal light Ls with respect to the Raman pumping light power is obtained.

Figure 3:
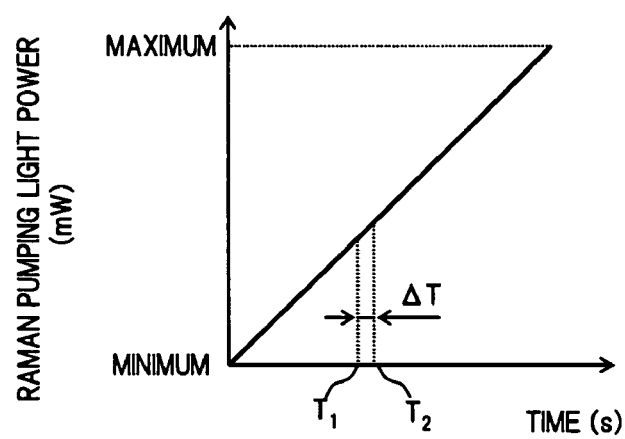
FIG. 3 shows an example of the change in Raman pumping light power at the time of acquiring the data of FIG. 2.

In the abovementioned procedure of the processing executed at the time of starting up the system, it is necessary to vary the Raman pumping light power from the minimum value to the maximum value within the required range, in both the transmission path connection state and the transmission path disconnection state. On the other hand, as another procedure of the data acquisition processing, for example as shown in FIG. 3, in the course of successively varying the Raman pumping light power from the minimum value to the maximum value, the cutoff section 4 may be controlled so that the transmission path connection state (time $T_1$ in FIG. 3) and the transmission path disconnection state (time $T_2$ in FIG. 3) are repeatedly switched at a required cycle $\Delta T$ (=$T_2-T_1$), so as to repeatedly measure the light power corresponding to the respective states of the cutoff section 4. Accordingly, even if the Raman pumping light power is changed just once ranging from the minimum value to the maximum value, relationships similar to the abovementioned cases shown in FIG. 2(A) to 2(C) can be acquired.

Figure 4:
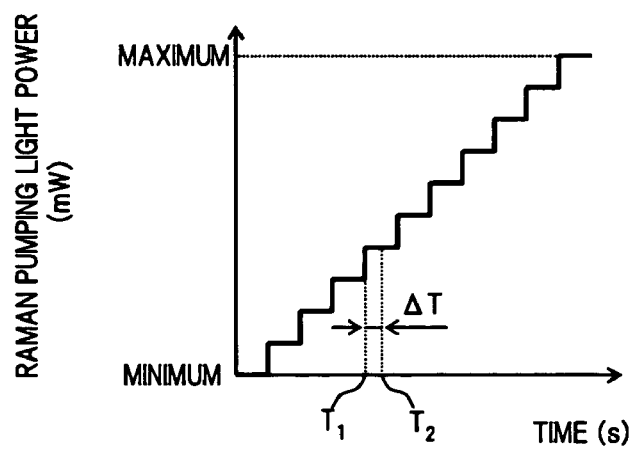
FIG. 4 shows another example of the change in Raman pumping light power at the time of acquiring the data of FIG. 2.

However, in the other procedure mentioned above, it is necessary to pay attention to the point that the accuracy of the ASS light correction varies depending on the speed of changing the Raman pumping light power. That is, if the speed of changing the Raman pumping light power is sufficiently slow, the difference of the Raman pumping light power in one cycle of $\Delta T$ is small, and the variation in the power of the ASS light due to this difference is at a negligible level. Therefore, the respective powers of the ASS light and the main signal light Ls corresponding to the Raman pumping light power can be obtained with relatively high accuracy. However, as the speed of changing the Raman pumping light power becomes faster, the variation in the power of the ASS light due to the difference of the Raman pumping light power in one cycle of $\Delta T$ becomes large, causing a nonnegligible effect in some cases. In such a case, for example as shown in FIG. 4, desirably the Raman pumping light source 3A is controlled so that the Raman pumping light power is varied in a stepped form, and the transmission path connection state and the transmission path disconnection state are switched while the Raman pumping light power is kept constant, so as to measure the light power in the respective states. As a result the respective powers of the ASS light and the main signal light Ls corresponding to the Raman pumping light power can be obtained with sufficiently high accuracy.

By using the respective relationships for the Raman pumping light power acquired at the time of starting up the system in the above manner, for example the optical signal to noise ratio (OSNR) corresponding to the Raman pumping light power can be obtained (refer to S/N in FIG. 2(C). Therefore, the set value of the Raman pumping light power for optimizing the OSNR can be determined for the respective transmission sections. This set value of the Raman pumping light power is not obtained by estimating the noise light power by calculation and then correcting it as with the abovementioned conventional technique, but is obtained by actually measuring the noise light power and then correcting it, and hence is highly accurate. Moreover, since the ASS light is corrected for each respective transmission section in the present optical transmission system, unrelated to the correction state in other transmission sections, errors are not accumulated even if the number of transmission sections is increased.

Next is a description of specific embodiments of the optical transmission system applied with the abovementioned basic configuration of the present invention.

Figure 5:
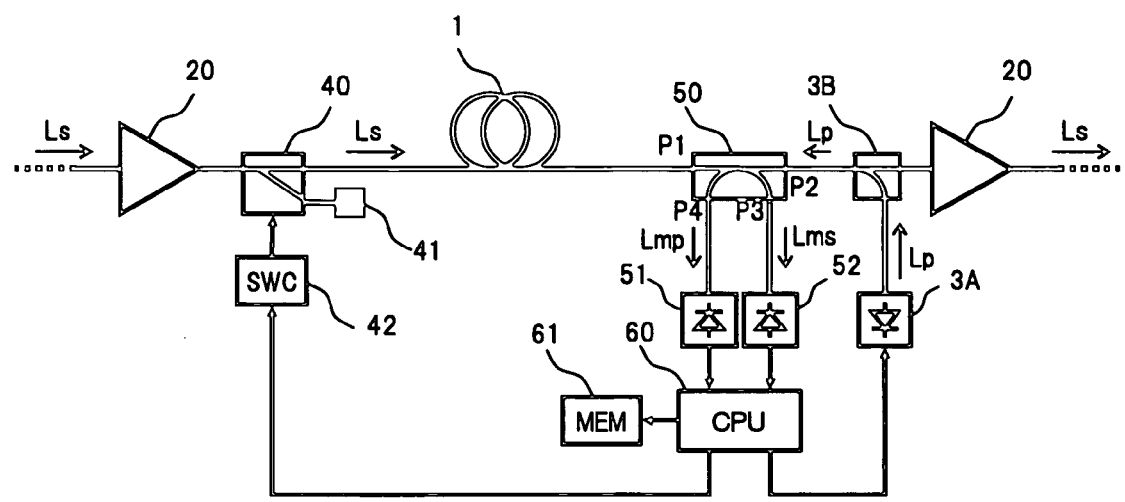
FIG. 5 is a block diagram showing the configuration of an optical transmission system according to a first embodiment of the present invention.

FIG. 5 is a block diagram showing a configuration of an optical transmission system according to a first embodiment of the present invention.

In the optical transmission system shown in FIG. 5, an optical amplifier 20 arranged on the optical transmission line 1 is a specific example of the optical transmitter 2 shown in FIG. 1, by which the main signal light Ls propagated through the optical transmission line 1 and inputted, is amplified to a required level locally inside and outputted. It is assumed here that this optical amplifier 20 performs automatic level control (ALC) to control the level of the output light to a constant.

An optical switch 40, a nonreflective terminator 41, and an optical switch control circuit (SWC) 42 constitute the abovementioned cutoff section 4 shown in FIG. 1. Regarding the optical switch 40, one input port is connected to the output terminal of the optical amplifier 20, and one of the two output ports is connected to the signal light input terminal of the optical transmission line 1 and the other is connected to the nonreflective terminator 41. This optical switch 40 can switch the connection state of the input/output ports in accordance with a signal outputted from the optical switch control circuit 42. Connection between the input port, and the output port linked to the optical transmission line 1 results in the abovementioned transmission path connection state. Connection between the input port, and the output port linked to the nonreflective terminator 41 results in the abovementioned transmission path disconnection state. The optical switch control circuit 42 generates a signal for controlling the optical switch 40 according to control information transferred from a CPU 60 described later.

An optical coupler 50 corresponds to the branch circuit 5A of the monitor section 5 shown in FIG. 1 mentioned above. A photodetector 51 and a photodetector 52 correspond to the photodetector circuit 5B of the monitor section 5. The optical coupler 50 has four ports P1 to P4. It branches a part of the pumping light Lp which is supplied from the Raman pumping light supply section 3A to the optical transmission line 1 via the WDM coupler 3B and inputted into the port P2, to the port P4, and outputs it to the photodetector 51 as a monitor light Lmp. It also branches a part of the light which is propagated in the same direction as that of the main signal light Ls through the optical transmission line 1 and inputted into the port P1, to the port P3, and outputs it to the photodetector 52 as a monitor light Lms. The photodetectors 51 and 52 respectively receive the monitor lights Lmp and Lms branched by the optical coupler 50, and output electric signals according to the respective light powers.

The CPU 60 and a memory (MEM) 61 are specific configuration examples of the abovementioned control section 6 and the processing section 7 shown FIG. 1. Electric signals respectively outputted from the photodetectors 51 and 52 are inputted into the CPU 60. The CPU 60 respectively determines the power of the pumping light Lp supplied to the optical transmission line 1, and the power of the light propagated through the optical transmission line 1, based on the output signals from the photodetectors 51 and 52, then executes the arithmetic processing for correcting the ASS light as mentioned above. The data processed by this CPU 60 is accumulated in the memory 61. Moreover, the CPU 60 generates signals for controlling the power of the pumping light Lp and the state of the optical switch 40, and outputs the control signals to the Raman pumping light source 3A and the optical switch control circuit 42 respectively.

In the optical transmission system having the configuration as mentioned above, similarly to the abovementioned case, at the time of starting up the system, the required data related to the transmission characteristic of the main signal light Ls is acquired for each transmission section. Here, for example, when a WDM signal light which is made by multiplexing a plurality of beams of signal light with different wavelengths, is inputted into the optical amplifier 20 as the main signal light Ls, the main signal light Ls is amplified to a certain output level by the optical amplifier 20 which operates the ALC and outputted to the optical transmission line 1. In such a state, pursuant to any specific procedure for data acquisition mentioned above, the output power of the Raman pumping light source 3A, and the connection state of the optical switch 40 are respectively controlled, the power of the pumping light Lp supplied to the optical transmission line 1 is measured by the photodetector 51, and the power of the light propagated through the optical transmission line 1 is measured by the photodetector 52. Then, the monitor results of the respective photodetectors 51 and 52 are arithmetic processed by the CPU 60, so that the data for the Raman pumping light power as shown in FIG. 2(A) to (C) mentioned above is acquired, and the results are stored in the memory 61.

Using the data which is acquired and stored at the time of starting up the system in the above manner, the OSNR corresponding to the Raman pumping light power is obtained, and the set value of the Raman pumping light power to optimize the OSNR is determined for each transmission section. The optimized set value of the Raman pumping light power is applied as the set value of the Raman pumping light power at the time of actual operation, after confirming that the level of the main signal light Ls which is propagated through the optical transmission line 1 and Raman amplified, is within the input dynamic range of the optical amplifier 20 of the pertinent transmission section (the optical amplifier located on the succeeding stage (receiver) side among the adjacent optical amplifiers). If the Raman pumping light power optimizing the OSNR is outside of the input dynamic range of the optical amplifier 20, the Raman pumping light power which makes the best OSNR within the input dynamic range is applied as the set value at the time of operation.

As mentioned above, according to the optical transmission system of the first embodiment, the ASS light which has heretofore been difficult to measure separately from the main signal light Ls, can be easily measured with a simple configuration, and it is possible to correct the ASS light with high accuracy. Moreover, by storing the data acquired at the time of starting up the system into the memory 61, then for example even at the time of wavelength increase/decrease setting after the operation is started, rather than newly acquiring the data, an optimum set value corresponding to the wavelength increase/decrease setting can be obtained on the basis of the data stored in the memory 61. Therefore, this is extremely effective in terms of system operation.

Figure 6:
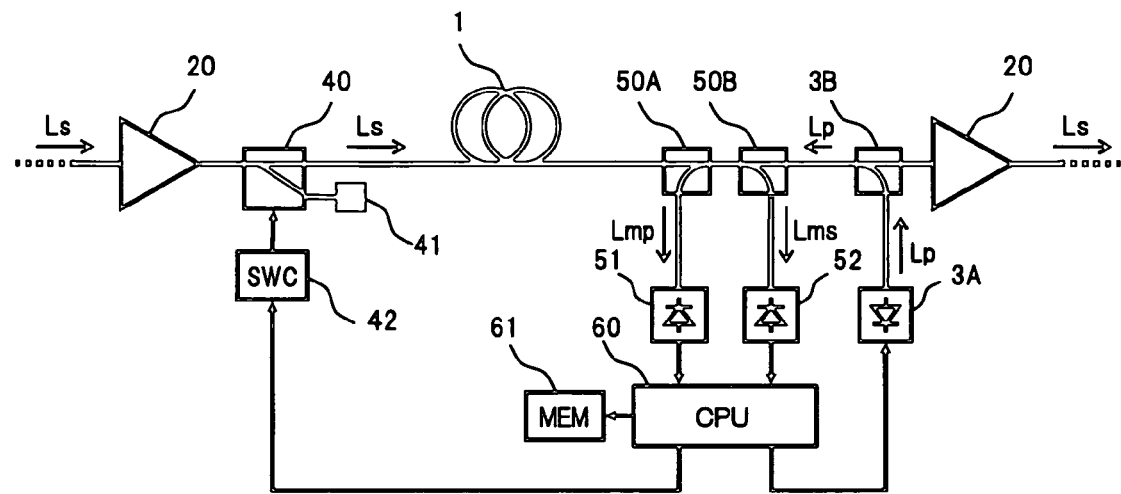
FIG. 6 shows an example of another configuration related to the first embodiment.

In the first embodiment, one example has been shown for where the monitor section 5 is constituted using the optical coupler 50 having four ports. However, as shown in FIG. 6, an optical coupler 50A for branching a part of the pumping light Lp supplied to the optical transmission line 1, and an optical coupler 50B for branching a part of the light propagated through the optical transmission line 1 may be separately provided. In this case, in order to improve the accuracy of ASS light correction, the respective optical couplers 50A and 50B are preferably arranged as close as possible Next is a description of an optical transmission system according to a second embodiment.

Figure 7:
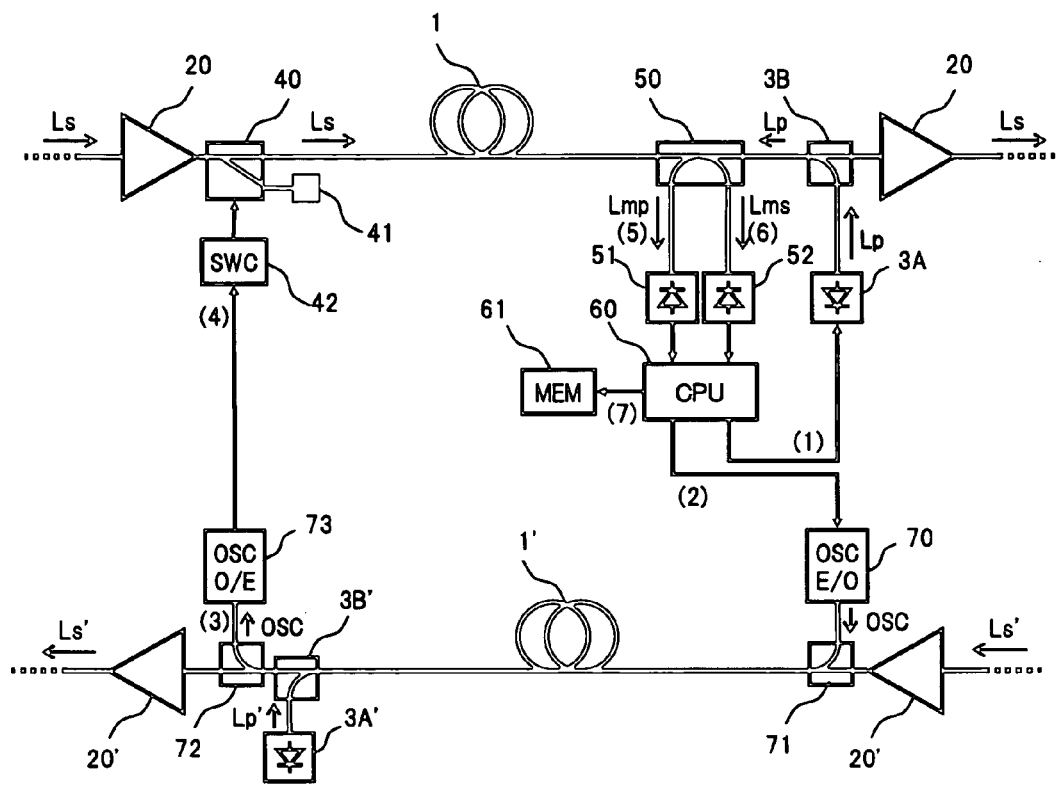
FIG. 7 is a block diagram showing the configuration of an optical transmission system according to a second embodiment of the present invention.

FIG. 7 is a block diagram showing the configuration of the optical transmission system according to the second embodiment.

In the optical transmission system shown in FIG. 7, with respect to the configuration of the abovementioned first embodiment shown in FIG. 5, optical supervisory channel (OSC) signals transmitted by opposed links are used as a means for transmitting control signals from the CPU 60 to the optical switch control circuit 42. The configuration on one link (up link) side shown in the upper part in FIG. 7 is basically the same as the configuration of the first embodiment. A difference is that control information outputted from the CPU 60 for controlling the optical switch 40 is sent to an OSC sending circuit (OSC E/O) 70 on the other link (down link) side shown in the lower part in FIG. 7, and the control information is transmitted from an OSC receiving circuit (OSC O/E) 73 on the down link side to the optical switch control circuit 42 on the up link side.

On the down link side, main signal light Ls' outputted from an optical amplifier 20' on the preceding stage located on the right in FIG. 7, is propagated through an optical transmission line 1' which is supplied with pumping light Lp' by a Raman pumping light source 3A' and a WDM coupler 3B' while being Raman amplified, and is transmitted to an optical amplifier 20' on the succeeding stage located on the left in FIG. 7. Moreover, the OSC signal outputted from the OSC sending circuit 70 is sent to the optical transmission line 1' via a WDM coupler 71, and propagated in the same direction as the direction of propagation of the main signal light Ls' through the optical transmission line 1'. Then, the OSC signal is demultiplexed by a WDM coupler 72 provided in the vicinity of the input terminal of the optical amplifier 20' on the succeeding stage, and sent to the OSC receiving circuit 73.

The OSC signal is a general optical signal used for transmitting supervisory control information between repeater nodes in a conventional optical transmission system. Here, the control information for switching the optical switch 40 on the up link side is added to the general OSC signal.

It is assumed that the configuration of FIG. 7 comprises a general configuration for sending and receiving the OSC signal on the up link side also (not shown). Moreover, configurations corresponding to the cutoff section, the monitor section, and the control section are not particularly provided on the down link side, however these configurations may be provided similarly to the up link side. In this case, the control information of the down link side is transmitted using the OSC signal on the up link side.

Next is a description of the data acquisition processing at the time of starting up the optical transmission system as mentioned above, with reference to the time charts in FIG. 8 and FIG. 9. Here, for example as shown in the FIG. 4, the case is considered where the Raman pumping light source 3A is controlled so as to vary the power of the pumping light Lp in a stepped form. Specifically, the variable range of the output power of the Raman pumping light source 3A is between 0 mW and 1000 mW, and the data is acquired by increasing the output power five times per second in 4 mW steps (4 mW/200 ms). In such a setting, it takes about 50 seconds to acquire all the data.

Figure 8:
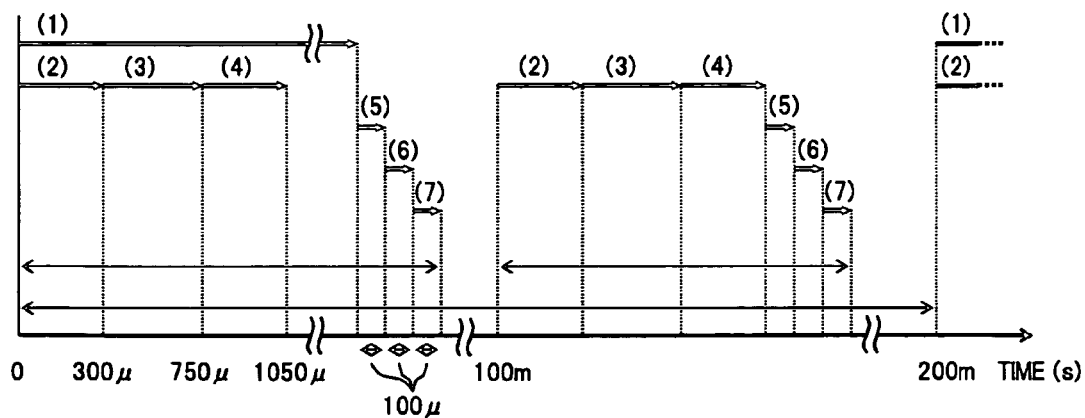
FIG. 8 is a time chart for explaining data acquisition processing in the second embodiment.

Firstly, the control signal for stabilizing the output power of the Raman pumping light source 3A at the initial value, is outputted from the CPU 60 to the Raman pumping light source 3A (refer to FIG. 7 and FIG. 8(1)). At the same time, the control information for setting the optical switch 40 to the transmission path connection state is transferred from the CPU 60 to the OSC sending circuit 70 on the down link side (refer to FIG. 7 and FIG. 8(2)). In the OSC sending circuit 70 which has received the control information from the CPU 60, the OSC signal loaded with the control information is generated, and sent to the optical transmission line 1' via the WDM coupler 71. Then, the OSC signal propagated through the optical transmission line 1' is taken out by the WDM coupler 72 and reception processed by the OSC receiving circuit 73 to extract the control information (refer to FIG. 7 and FIG. 8(3)). The control information extracted by the OSC receiving circuit 73 is transferred to the optical switch control circuit 42 on the up link side, and the control signal for setting the optical switch 40 to the transmission path connection state is outputted from the optical switch control circuit 42 (refer to FIG. 7 and FIG. 8(4)). When the optical switch 40 is stabilized in the transmission path connection state, information to notify of this, it is transferred to the CPU 60 for example using the OSC signal on the up link side.

In the CPU 60, when the stability of the optical switch 40 is confirmed, and the output stability of the Raman pumping light source 3A is determined, the pumping light power is detected on the basis of the output signal from the photodetector 51, and subsequently the power of the light propagated through the optical transmission line 1 (main signal light+ASS light) is detected on the basis of the output signal from the photodetector 52. Then the respective detection results are stored in the memory 61 (refer to FIG. 7 and FIG. 8(5) to (7)).

When 100 ms has elapsed from the beginning of the processing, the control information for setting the optical switch 40 to the transmission path disconnection state is transferred from the CPU 60 to the OSC sending circuit 70 on the down link side, and then loaded onto the OSC signal on the down link side and transferred to the optical switch control circuit 42. Then, similarly to the abovementioned case, the pumping light power and the power of the ASS light in the transmission path disconnection state are detected, and the respective detection results are stored in the memory 61 (refer to the middle part of FIG. 8).

Figure 9:
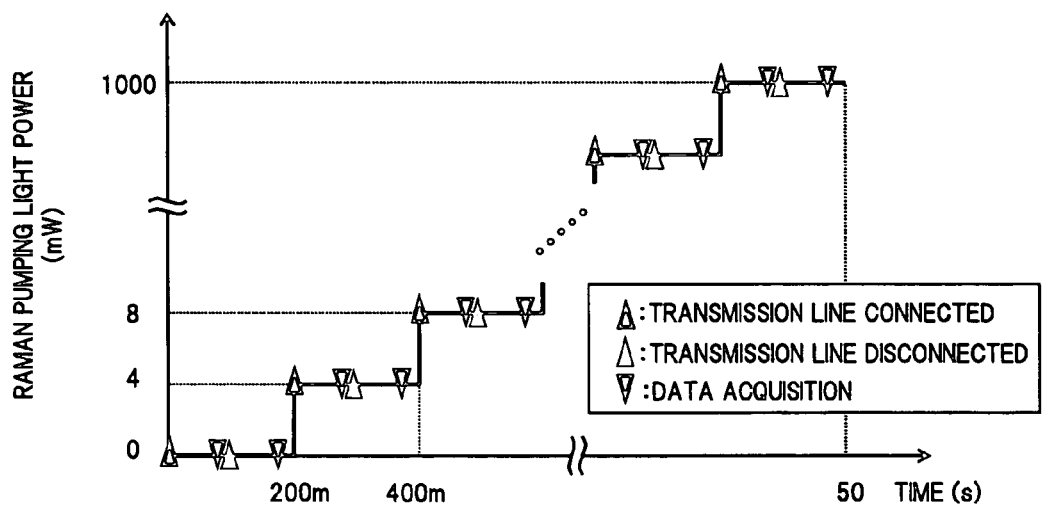
FIG. 9 is an explanatory diagram of the relation of the change in Raman pumping light power and data acquisition timing in the second embodiment.

In this manner, data for the transmission path connection/disconnection state at the same pumping light power are acquired. When 200 ms has elapsed from the beginning of the processing, a control signal for increasing the output power of the Raman pumping light source 3A to 4 mW is outputted from the CPU 60 to the Raman pumping light source 3A. Then, similar processing to that of the abovementioned case is sequentially repeated. FIG. 9 is a schematic summary of a series of the processing flow when the output power of the Raman pumping light source 3A is varied between 0 mW and 1000 mW.

As mentioned above, according to the optical transmission system of the second embodiment, the switching control of the optical switch 40 is performed using the OSC signals of the opposed link, thus facilitating realization of the transmission of the control information between the CPU 60 and the optical switch control circuit 42 which are set apart.

Next is a description of an optical transmission system according to a third embodiment.

Figure 10:
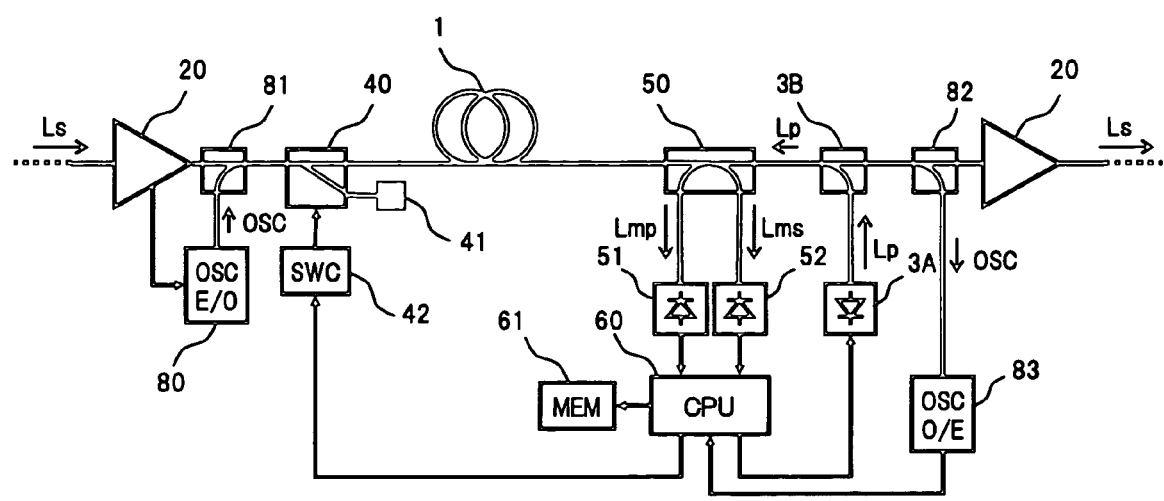
FIG. 10 is a block diagram showing the configuration of an optical transmission system according to a third embodiment of the present invention.

FIG. 10 is a block diagram showing the configuration of the optical transmission system according to the third embodiment.

The optical transmission system shown in FIG. 10 is an application example for the configuration of the aforementioned first embodiment shown in FIG. 5, wherein information related to the power of the main signal light Ls sent from the optical amplifier 20 on the preceding stage to the optical transmission line 1, is loaded onto the OSC signal of the local link and transmitted to the succeeding stage side, so that the data for the Raman gain by which the ASS light was corrected, can be obtained.

Specifically, the information related to the power of the main signal light Ls outputted from the optical amplifier 20 on the preceding stage (the total power of the signal light of the wavelengths for when the main signal light Ls is WDM signal light) is transferred from the optical amplifier 20 on the preceding stage to an OSC sending circuit 80. The OSC sending circuit 80 loads the information related to the power of the main signal light Ls outputted from the optical amplifier 20 on the preceding stage, onto the OSC signal which is generally used in a conventional optical transmission system, and outputs it to a WDM coupler 81. The WDM coupler 81 is arranged for example between the optical amplifier 20 on the preceding stage and the optical switch 40, and multiplexes the OSC signal from the OSC sending circuit 80 with the main signal light Ls and sends it to the optical transmission line 1.

The OSC signal propagated together with the main signal light Ls through the optical transmission line 1 is demultiplexed for example by a WDM coupler 82 which is arranged between the WDM coupler 3B for supplying the pumping light Lp to the optical transmission line 1, and the optical amplifier 20 on the succeeding stage, and sent to an OSC receiving circuit 83. The OSC receiving circuit 83 reception processes the OSC signal from the WDM coupler 82 to extract the information related to the power of the main signal light Ls outputted from the optical amplifier 20 on the preceding stage, and transfers it to the CPU 60. Configurations of parts except for the OSC sending circuit 80, the WDM couplers 81 and 82, and the OSC receiving circuit 83, are similar to the configurations in the first embodiment.

In the optical transmission system having the abovementioned configuration, for example, in the data acquisition processing at the time of starting up the system as described in the first embodiment, firstly the information related to the power of the main signal light Ls outputted from the optical amplifier 20 on the preceding stage is loaded onto the OSC signal, and the OSC signal is propagated through the optical switch 40 controlled in the transmission path connection state, and the optical transmission line 1, and transmitted to the OSC receiving circuit 83. When transmitting this OSC signal, the Raman pumping light source 3A is not driven so as not to supply the pumping light Lp to the optical transmission line 1, and the power of the main signal light Ls which is outputted from the amplifier 20 on the preceding stage and propagated through the optical transmission line 1 is measured using the photodetector 52. Then the measurement result is transferred to the CPU 60. Accordingly, in the CPU 60, by subtracting the receiving power of the main signal light Ls measured using the photodetector 52, from the sending power of the main signal light Ls transferred while loaded onto the OSC signal, the loss of the optical transmission line 1 in the pertinent transmission section is obtained, and the data related to the sending power of the main signal light Ls and the loss of the optical transmission line 1 is stored in the memory 61.

After the data related to the loss of the optical transmission line 1 is acquired in the above manner, then similarly to the abovementioned first embodiment, the power of the main signal light and the power of the ASS light with respect to the Raman pumping light power are measured, and the measurements results are stored in the memory 61. Then, in the CPU 60, by using the data stored in the memory 61, the Raman gain by which the ASS light was corrected is calculated. Specifically this calculation of the Raman gain is performed in accordance with a relationship shown in the following equation (1) assuming that the power of the main signal light Ls outputted from the optical amplifier 20 on the preceding stage is $P_1$, the loss of the optical transmission line 1 is Loss, the power of the received light when the Raman pumping light having the required power to optimize the OSNR is supplied to the optical transmission line 1 (main signal light Ls+ASS light) is $P_2$, and the power of sole ASS light is $P_{ASS}$.

$$\text{Raman gain: } G=(P_2-P_{ASS})/(P_1-\text{Loss}) \tag{1}$$

In this manner, the Raman gain by which the ASS light was corrected is calculated, and the data is stored in the memory 61, thereby enabling the Raman gain of the pertinent transmission section to be set more accurately at the beginning of the operation or at the subsequent wavelength increase/decrease setting, and enabling highly accurate level adjustment to be realized for the main signal light Ls to be inputted into the optical amplifier 20 on the succeeding stage.

The configuration shown in the third embodiment can of course be combined with the aforementioned second embodiment. In this case, the information related to the power of the main signal light outputted from the optical amplifier on the preceding stage in the local link, and the control information of the optical switch in the opposed link are respectively loaded onto the OSC signals which are propagated through the respective links.

The present invention enables provision of an optical transmission system wherein the main signal light and the ASS light can be separately measured easily with a simple configuration, and the ASS light in the respective transmission sections can be corrected with high accuracy regardless of the correction state in the other transmission sections. Therefore industrial applicability is significant.

What is claimed is:

1. An optical transmission system comprising:
   an optical transmission line through which a main signal light is propagated having
   a plurality of optical transmitters, and
   a plurality of transmission sections, each transmission section being connected to an input side of one optical transmitter of said plurality of optical transmitters, and including:

a cutoff section configured to cutoff the main signal light outputted from a preceding optical transmitter and inputted into a Raman amplification medium;
   a Raman pumping light supply section supplying pumping light to the Raman amplification medium;
   a monitor section connected to an output side of the Raman amplification medium, and measuring a power of the pumping light supplied by the Raman pumping light supply section to said Raman amplification medium, and a power of Raman amplified light output by the transmission section to the optical transmitter;
   a control section controlling said Raman pumping light supply section at the time of starting up the system, to vary the power of the pumping light supplied to said Raman amplification medium, controlling said cutoff section depending on the power of said pumping light, and switching the cutoff section between a connection state in which the main signal light propagates through said Raman amplification medium, and a disconnection state in which the main signal light does not propagate through said Raman amplification medium; and
   a processing section located between the monitoring section and the control section, to detect a power of a noise light generated due to the Raman pumping light, and a power of the main signal light inputted into the optical transmitter based on the power of the pumping light supplied by the Raman pumping light supply section to said Raman amplification medium, and the power of the Raman amplified light output by the transmission section to the optical transmitter measured by said monitor section in the connection and disconnection state of said cutoff section, and the processing section executes a calculation to correct said noise light.

2. An optical transmission system according to claim 1, wherein said control section controls said Raman pumping light supply section so as to successively vary the power of the pumping light supplied to said Raman amplification medium within a preset range, and controls said cutoff section to switch between the connection state and the disconnection state upon completion of one variation of said pumping light power over said range.

3. An optical transmission system according to claim 1, wherein said control section controls said Raman pumping light supply section so as to successively vary the power of the pumping light supplied to said Raman amplification medium within a preset range, and controls said cutoff section so as to periodically switch between the connection state and the disconnection state, during one variation of said pumping light power over said range.

4. An optical transmission system according to claim 3, wherein the power of the pumping light supplied to said Raman amplification medium vary in a stepped form, and controls said cutoff section in accordance with a cycle corresponding to a duration of said step.

5. An optical transmission system according to claim 1, wherein said processing section obtains a relationship for the power of the noise light with respect to the power of the Raman pumping light using the powers measured by said monitor section when said cutoff section is controlled to the disconnection state, and subtracts the power of the light propagated through said optical transmission line measured by said monitor section when said cutoff section is controlled to the disconnection state, from the power of the propagation light measured by said monitor section for when said cutoff section is controlled to the connection state, to thereby obtain a relationship for the main signal light power with respect to the Raman pumping light power.

6. An optical transmission system according to claim 5, wherein said processing section uses the relationship for the power of the noise light with respect to the power of the Raman pumping light and the relationship for the power of the main signal light with respect to the power of said Raman pumping light to obtain a relationship for the optical signal to noise ratio with respect to the power of the Raman pumping light, and determines a set value of the power of the Raman pumping light in the connection state of the cutoff section, based on the relationships.

7. An optical transmission system according to claim 1, wherein said processing section includes a memory circuit for storing processed data.

8. An optical transmission system according to claim 1, wherein said cutoff section includes an optical switch.

9. An optical transmission system according to claim 1, wherein said cutoff section includes an optical shutter.

10. An optical transmission system according to claim 1, wherein said optical transmitter includes an optical amplifier which performs automatic level control to control a level of the light output to a constant.

11. An optical transmission system according to claim 1, wherein said monitor section includes:
an optical coupler branching a part of the pumping light supplied from said Raman pumping light supply section to said Raman amplification medium, and a part of the Raman amplified light propagated through said optical transmission line, and inputted into the optical transmitter;
a first photodetector for measuring the power of the part of the pumping light branched by said optical coupler; and
a second photodetector for measuring the power of the part of the Raman amplified light branched by said optical coupler.

12. An apparatus comprising:
an optical switch switchable between a first state in which a main signal light input from upstream is provided to a Raman amplification medium, and a second state in which the main signal light is cut off from being provided;
a Raman pumping light supplying section supplying Raman pumping light to the Raman amplification medium so that the main signal light is Raman amplified as the main signal light travels through the Raman amplification medium;
a control section controlling the optical switch to be in one of the first and second states and controlling the Raman pumping light supplying section to vary power of the supplied Raman pumping light as the optical switch is in said one of the first and second states, and then controlling the optical switch to be in the other of the first and second states and controlling the Raman pumping light supplying section to vary power of the supplied Raman pumping light as the optical switch is in said other of the first and second states;
a monitor section connected to the output of the Raman amplification medium, measuring power of the supplied Raman pumping light and power of light provided through the Raman amplification medium as the power of the supplied Raman pumping light is being varied with the optical switch controlled to be in said one of the first and second states, and measuring power of the supplied Raman pumping light and power of light provided through the Raman amplification medium as the power of the supplied Raman pumping light is being varied with the optical switch controlled to be in said other of the first and second states; and
a processing section located between the monitoring section and the control section, detecting power of noise light generated due to the supplying of Raman pumping light to the Raman amplification medium, and power of the provided main signal light, in accordance with the powers measured by the monitor section with the optical switch controlled to be in said one of the first and second states and the powers measured by the monitor section with the optical switch controlled to be in said other of the first and second states.

13. An apparatus as in claim 12, wherein the control section controls the Raman pumping light supplying section to supply Raman pumping light in accordance with the detected powers of noise light and the detected powers of the main signal light by the processing section, to reduce the effect of the noise light.

14. An apparatus comprising:
a cutoff section switchable between a first state in which a main signal light input from upstream is transmitted through a Raman amplification medium, and a second state in which the main signal light is cut off from being transmitted;
a Raman pumping light supplying section supplying Raman pumping light to the Raman amplification medium so that the main signal light is Raman amplified as the main signal light propagates through the Raman amplification medium;
means for controlling the cutoff section to be in one of the first and second states and controlling the Raman pumping light supplying section to vary power of the supplied Raman pumping light as the cutoff section is in said one of the first and second states, and then controlling the cutoff section to be in the other of the first and second states and controlling the Raman pumping light supplying section to vary power of the supplied Raman pumping light as the cutoff section is in said other of the first and second states;
means for measuring power of the supplied Raman pumping light and power of light provided through the Raman amplification medium as the power of the supplied Raman pumping light is being varied with the cutoff section controlled to be in said one of the first and second states, and measuring power of the supplied Raman pumping light and power of light provided through the Raman amplification medium as the power of the supplied Raman pumping light is being varied with the cutoff section controlled to be in said other of the first and second states, wherein the means for measuring power are located at an output side of the Raman amplification medium; and
means for detecting power of noise light generated due to the supplying of Raman pumping light to the Raman amplification medium, and power of the provided main signal light, in accordance with the powers measured with the cutoff section controlled to be in said one of the first and second states and the powers measured with the cutoff section controlled to be in said other of the first and second states.

15. An apparatus as in claim 14, wherein said means for controlling controls the Raman pumping light supplying section to supply Raman pumping light in accordance with the detected powers of noise light and the detected powers of the main signal light, to reduce the effect of the noise light.

16. A method of correcting for noise in a Raman amplifier disposed between optical transmitters on an optical transmission line, comprising:

amplifying an input optical signal in a Raman amplification medium using pumped light;

measuring power of the optical signal output from the Raman amplification medium;

switching off the input optical signal;

measuring power of light output from the Raman amplification medium when the input optical signal is switched off; and calculating and correcting power of a noise and power of the input optical signal using the measured powers as output from the Raman amplification medium.

* * * * *